017
United States Patent [19]

Roth

[11] 4,231,822

[45] Nov. 4, 1980

[54] NON-POLLUTING PROCESS FOR DESENSITIZING EXPLOSIVES

[75] Inventor: Milton Roth, Rockaway, N.J.

[73] Assignee: The United States of America as represented by the Secretary of the Army, Washington, D.C.

[21] Appl. No.: 970,404

[22] Filed: Dec. 18, 1978

[51] Int. Cl.$^3$ ............................................. C06B 21/00
[52] U.S. Cl. ............................... 149/109.6; 149/19.92; 149/92; 149/105; 264/3 R
[58] Field of Search ................... 149/19.92, 109.6, 92, 149/105; 264/3 R

[56] References Cited

U.S. PATENT DOCUMENTS

| | | | |
|---|---|---|---|
| 3,586,551 | 6/1971 | Nolan | 149/92 |
| 3,706,607 | 12/1972 | Chrisp | 149/92 |
| 3,778,320 | 12/1973 | Yosim et al. | 149/105 |
| 4,018,676 | 4/1977 | Hoffsommer et al. | 149/109.6 |
| 4,038,116 | 7/1977 | Andrews et al. | 149/105 |
| 4,057,442 | 11/1977 | Shaw et al. | 149/19.92 |
| 4,098,627 | 7/1978 | Tompa et al | 149/19.92 |

*Primary Examiner*—Edward A. Miller
*Attorney, Agent, or Firm*—Nathan Edelberg; Robert P. Gibson; A. Victor Erkkila

[57] ABSTRACT

A method for desensitizing explosive materials consisting of the elements of carbon, hydrogen, oxygen and nitrogen, comprises contacting the explosive material with a reductant containing no elements besides those contained in the explosive material for a period of time sufficient to desensitize said explosive, and thereafter disposing of said explosive by combustion or other means suitable for a non-explosive solid, e.g., landfill. The method of the present invention possesses important advantages in that it eliminates polluting by-products from prior art reductants and provides energy savings in reduced time and fuel requirements for the combustion of the explosive materials.

5 Claims, No Drawings

NON-POLLUTING PROCESS FOR DESENSITIZING EXPLOSIVES

The invention described herein may be manufactured, used and licensed by or for the Government for Governmental purposes without payment to me of any royalties thereon.

BACKGROUND OF THE INVENTION

The present invention relates to the area of explosive materials, and specifically to the desensitization and disposal of such explosives.

It has long been a practice to destroy explosive materials and propellants determined to be either obsolete or deteriorated by open incineration or burning. With the enactment of the pollution abatement legislation, the practice of open burning of propellants and explosives had to be replaced by controlled incineration so that ambient air standards could be met. Controlled incineration generally requires that the explosive material in question be placed in a slurry in water prior to being ground up and incinerated so that the materials would be safer to handle. The concentration of explosive material that could be placed in such a slurry, however, was restricted to an amount approximately equal to that required to barely sustain combustion in order to minimize the hazard of burning excessive quantities. Such restriction on concentration increases the cost of incineration, as the time for processing a given quantity of explosive is increased and the fuel required to incinerate that explosive is likewise greater.

In particular, the explosives and propellants known as TNT, RDX, HMX, nitroglycerin, nitroguanidine, and nitrocellulose comprise a group of organic compounds sharing in common the elements of carbon, hydrogen, oxygen and nitrogen, which, upon combustion, form the oxides of carbon and nitrogen in addition to water. All of the above compounds, since they contain the same elements, tend to form the same combustion products, and have similar functional groups which are the bases for their energetic properties.

It is known to employ sodium sulfide as a reductant for desensitizing explosives and/or propellants. However, the particular reductant, $Na_2S$, is undesirable in an incineration or water treatment process as it introduces new elements, and new pollutants, into the system. Thus, while complete deactivation is achieved, increased pollution likewise occurs. Accordingly, the need has arisen for reductants which achieve the desired desensitization of the energetic materials without increasing the variety of pollution caused by the incineration process and without the introduction of any difficulties in the removal of the reductant after deactivation is achieved.

SUMMARY OF THE INVENTION

In accordance with the present invention, there is provided a method for desensitizing organic explosives and propellants consisting of carbon, hydrogen, oxygen and nitrogen, hereinafter referred to briefly as explosive materials in the specification and claims. The method comprises contacting the explosive material with a reductant, which contains only elements selected from the group consisting of carbon, hydrogen, oxygen, and nitrogen, i.e. contains no elements besides those contained in the explosive material, maintaining said explosive material and said reductant in contact for a period of time sufficient to desensitize said explosive material, and disposing of said desensitized explosive material in suitable manner, such as by combustion. In accordance with the method of the present invention, the reductant may be dissolved in an aqueous solution, the explosive material admixed therewith, the resulting mixture then permitted to react for a time sufficient to achieve the desired degree of desensitization of the explosive material, after which the explosive material thus treated can be separated from the solution and subsequently disposed of in accordance with conventional procedures, e.g., combustion or landfill.

The employment of the reductants of the present invention produces no new pollutants when compared to incineration conducted without the reductants, as no new elements are introduced into the mixture. Further, the employment of the reductants of the present invention permits greater concentrations of explosive materials to be ground and incinerated at a given time, whereby savings in processing time as well as fuel requirements are obtained. Further, the concentration of the reductants in solution is limited only by the solubility of the respective reductants in water at room temperature. Desensitization of the explosive materials in contact with the reductant solution may range in time from ½ hour, to 24 hours, during which time the mixtures may be maintained at temperatures ranging from room temperature up to the boiling point of the solution. Finally, the reductants may be either acidic or alkaline in nature with alkaline reductants being preferred.

As an alternate embodiment, the reductant and the explosive material may both be placed in solution. After the desensitization reaction is complete, the excess reductant, e.g. oxalic acid, can be removed by addition of lime to precipitate insoluble calcium oxalate, or by using ion exchange resins for removing other ionic reductants in known manner, to facilitate the further processing of the desensitized material, if required. In a further alternate embodiment, the reductant may be prepared in a solid form, e.g. as a porous bed of calcium oxalate, and a solution of the explosive then allowed to percolate therethrough, whereby desensitization is obtained.

Accordingly, it is a principal object of the present invention to provide a method for desensitizing explosives which achieves optimum desensitization and breakdown of the explosive material.

It is a further object of the present invention to provide a method as aforesaid wherein a reductant is employed.

It is a yet further object of the present invention to provide a method as aforesaid wherein a reductant is employed without causing an increase in the variety of pollution.

It is a yet further object of the present invention to provide a method as aforesaid which permits greater concentrations of explosives to be incinerated, with the result that savings in processing time and fuel for incineration are achieved.

Other objects and advantages will become apparent to those skilled in the art from a review of the ensuing description.

DESCRIPTION OF THE PREFERRED EMBODIMENTS

In accordance with the present invention, the foregoing objects and advantages are readily attained.

The present invention comprises a method for desensitizing an explosive material composed of the elements of carbon, hydrogen, oxygen and nitrogen, which method comprises providing a reductant containing only elements selected from the group consisting of carbon, hydrogen, oxygen, and nitrogen, thus introducing no elements besides those contained in the explosive material, contacting said explosive material with said reductant for a period of time sufficient to desensitize said explosive material, and thereafter disposing of said explosive material by suitable means, such as combustion. More particularly, the method of the present invention comprises mixing said explosive material with a solution of said reductant, allowing said mixture to react for a period of time sufficient to desensitize said explosive material and incinerating the desensitized product to effect the final disposal thereof. In the preferred embodiment of the method of the present invention, the solvent employed consists of or contains water, which may be removed by decanting, draining, or filtering from the mixture of the desensitized explosive material and the reductant prior to incineration. Also, the mixture of the explosive material and the reductant may be reacted for a period of up to twenty-four hours or longer to facilitate the complete desensitization of the explosive material. The reaction may be conducted at a temperature ranging from room temperature to the boiling point of the solution.

The method of the present invention applies primarily to propellants and explosives comprising nitro-substituted organic compounds. The said materials contemplated by the present invention comprise 2,4,6-trinitrotoluene, known as TNT; other cyclic nitrogen-containing, polynitro-substituted organic ring compounds, such as 1,3,5-trinitro-1,3,5-triazacyclohexane, known as RDX; and 1,3,5,7-tetranitro-1,3,5,7-tetrazacyclooctane, known as HMX; and other poly-substituted nitro compounds such as nitroguanidine, nitroglycerin, and nitrocellulose. All of the foregoing materials have in common the nitro substituent bonded to either a carbon, oxygen, or nitrogen atom.

With the enactment of the pollution abatement legislation, the practice of open burning of propellants and explosives had to be replaced by controlled incineration so that ambient air standards would not be exceeded. All controllable incineration requires slurrying the explosive material in water prior to subsequent operations of grinding and incinerating in order to make the material safer to handle. However, the concentration of explosive material in the slurry is restricted to an amount approximately equal to that required to just sustain combustion. This restriction increases the cost of incineration due to the fuel requirements and processing time.

In accordance with the present invention, it has been unexpectedly found that certain materials can be employed as reductants which are capable of achieving the desired levels of desensitization without the generation of additional pollutants. The reductants employed in accordance with the present invention contain only elements selected from the group consisting of carbon, hydrogen, oxygen and nitrogen, i.e. those elements that are present in the explosive material. More particularly, reductants useful in accordance with the present invention include organic compounds composed only of carbon, hydrogen and oxygen, such as: acetaldehyde, citric acid, formaldehyde, formic acid, lactic acid, maleic acid, malic acid, malonic acid, oxalic acid, tartaric acid, and glucose. Other reductant compounds may be employed which contain only carbon and oxygen, e.g. carbon monoxide, as well as reductant compounds which contain nitrogen in addition to the other elements, such as: ammonium formate, ammonium oxalate, ammonium azide, dimethylhydrazine, hydrazine and its hydrate, hydroxylamine, and urea. Further, reductant compounds containing only carbon and hydrogen, e.g. methane, ethylene and acetylene may be employed. All of the aforenoted reductants possess the advantage that they are composed of the same elements contained in the explosive materials, so that upon desensitization of the explosive materials, and their subsequent incineration, no pollutants are formed other than those resulting from combustion of the explosive, or propellant, itself.

The method of the present invention may be practiced by first placing the reductants in solution. In the preferred embodiment, water is employed as the solvent, as it is the least expensive and yields the best results in practice. The concentration of the reductants is not critical as it depends upon the solubility of the particular reductant, and may range up to a maximum of the saturation amount of that reductant in water. In a preferred embodiment, the concentration of the reductants may range from approximately 0.1 Molar to approximately 10 Molar.

After the solution containing the reductant is prepared, the explosive material, usually in granulated form, is admixed therewith to form a slurry. The resulting slurry or mixture is maintained for a period of time sufficient to enable the reductant to fully react with the explosive material and to promote desensitization thereof. During this period, the slurry may be agitated to insure mixing and intimate contact of the explosive material with the reducing solution. The time of reaction required to accomplish the desired degree of desensitization depends upon a number of variables, e.g. the temperature, the particular reductant and explosive material involved.

The description of the invention will proceed with reference to the following illustrative examples.

EXAMPLE 1

Several reductants, comprising oxalic acid, ammonium oxalate, formic acid and urea in varying concentrations, were prepared in individual water solutions. Several slurries were prepared each containing five parts of granular TNT in 95 parts of the reductant solution, and the resulting slurries were mixed for 30 minutes at room temperature. After mixing was complete, the desensitized TNT was separated from the slurry by filtration, water washed and then dried.

The resultant desensitized TNT was then subjected to the Picatinny Arsenal Impact Test wherein a quantity of the explosive is placed in a steel cup, after which a weight, suspended a measured distance above the explosive, is permitted to drop thereon, at which time it is observed as to whether detonation takes place. The degree of desensitization is thus determined by the minimum height from which the weight falls and effects detonation. A greater degree of desensitization is indicated by a greater height of fall required for detonation. A height of from 14–15 inches has been determined as representative of a standard impact value for TNT. The results of this test are set forth below.

TABLE 1
TNT DESENSITIZATION BY REDUCTANTS

| REDUCTANT | CONCENTRATION (MOLARITY) | IMPACT (INCHES) |
|---|---|---|
| Oxalic acid | 1 | 22 |
| Ammonium oxalate | 0.3 | 21 |
| Formic acid | 1 | 22 |
| Formic acid | 0.2 | 20 |
| Urea | 10 | 24 |

As can be seen from the above, each of the reductants effected a desensitization of the TNT in accordance with the present invention.

EXAMPLE 2

Comparative tests employing aqueous solutions of certain of the reductants and sodium sulfide, and water slurries of the explosive materials containing no desensitizer, were conducted with TNT and RDX. Specifically, the novel reductants tested were oxalic acid, formic acid, glucose, and hydrazine. Solutions of the reductants were prepared at two molarities for each reductant, including sodium sulfide, and slurries were prepared with each of the explosives at the concentrations of 5% and 30%, respectively. Each reductant was thus tested with four samples of explosives at each concentration. The slurries were prepared as set forth in Example 1 but were permitted to react overnight before being filtered, dried and tested.

The results of the tests are set forth below:

TABLE 2
COMPARATIVE TESTING OF REDUCTANTS WITH TNT AND RDX

| REDUCTANT | CONCENTRATION (MOLARITY) | IMPACT TEST (INCHES) | | | |
|---|---|---|---|---|---|
| | | TNT, % | | RDX, % | |
| | | 5 | 30 | 5 | 30 |
| Oxalic acid | 0.5 | 23 | 22 | 18 | 21 |
| | 1 | 23 | 22 | 18 | 22 |
| Formic acid | 1 | 24 | 25 | 20 | 20 |
| | 5 | 25 | 25 | 22 | 20 |
| Glucose | 1 | 21 | 22 | — | — |
| | 5 | 23 | 28 | — | — |
| Hydrazine | 1 | 38 | 34 | 25 | — |
| | 5 | 34 | 34 | 25 | — |
| Sodium sulfide | 1 | 36 | 34 | 26 | — |
| | 5 | 36 | 33 | 27 | — |
| Water (no reductant) | | | | | |

Referring to Table 2, it is apparent that the reductants of the present invention are capable of desensitizing the respective explosives in like magnitude and manner to that achieved by the conventional reduction with sodium sulfide and, in view of the improved pollution abatement resulting from the present invention, are clearly more desirable for use.

EXAMPLE 3

Detonability tests were conducted to obtain further evidence of the desensitizing properties of oxalic and formic acids. These tests were carried out by employing a slurry containing 60% of TNT in an aqueous solution of oxalic acid in one instance, and in an aqueous solution of formic acid in the other. In particular, the respective slurries were prepared by adding 60 parts of granular TNT in one case to 40 parts of a 10% aqueous solution of oxalic acid dihydrate and in the second case to 40 parts of a 50% aqueous solution of formic acid. Each slurry was poured into a stainless steel pipe 24 inches long and 2 inches inside diameter. The ends of the pipe were sealed with a thin plastic film such as Saran Wrap ®, and to one end of the pipe an explosive charge consisting of 150 grams of RDX was attached and subsequently exploded. In previous tests, wherein a slurry containing 55% of TNT in water alone was used, the pipe was completely destroyed because the detonation of the RDX propagated the explosion of the TNT. However, in both cases where the desensitizers were used, no propagation of explosion was obtained even though a 60% TNT concentration was present. With the formic acid, 10½ inches of the pipe remained intact, while with the oxalic acid, 14 inches remained intact.

From the above results, it is apparent that desensitization of the TNT was effected by the employment of the aforenoted quantities of oxalic and formic acids. The foregoing tests thus served as additional evidence that the reductants in accordance with the present invention are capable of successfully desensitizing the explosive compound as contemplated.

As noted earlier, the present invention may be practiced in an alternate embodiment, wherein the explosive materials are placed in solutions rather than slurries and the reductants, retained in like solutions, permitted to react therewith. Subsequent to completion of such reaction, the solutions can be chemically separated by the employment of precipitating salts or ion exchange resins for removal of unreacted ionic reductants, which would effectively segregate the desensitized explosive materials for final disposal by incineration.

In a yet further embodiment of the present invention, the aforementioned solutions containing the explosive materials can be desensitized by contact with the reductants provided in solid form. Thus, for example, calcium oxalate, which is essentially insoluble in water, can be used as a porous bed through which the solution of explosive can percolate. The effluent solution from the bed will be free of the explosive.

This invention may be embodied in other forms or carried out in other ways without departing from the spirit or essential characteristics thereof. The present invention is, therefore, to be considered as in all respects illustrative and not restrictive, the scope of the invention being indicated by the appended claims, and all changes which come within the meaning and range of equivalency are intended to be embraced therein.

What is claimed is:

1. A method for desensitizing an explosive material containing at most the elements of carbon, hydrogen, oxygen and nitrogen, said method consisting essentially of:

preparing a slurry of said explosive material in an aqueous solution of a reductant containing no elements besides those contained in said explosive material, said reductant being selected from the group consisting of acetaldehyde, citric acid, formaldehyde, formic acid, lactic acid, maleic acid, malic acid, malonic acid, oxalic acid, tartaric acid and glucose, wherein said explosive material is present essentially in solid, particulate form, and reacting said explosive material and said reductant in said slurry for a period of time sufficient to achieve desensitization of said explosive material.

2. The method of claim 1, wherein said solution contains said reductant in a concentration ranging up to the saturation point strength.

3. The method of claim 1, wherein said contacting step is conducted for a period of time ranging from about 30 minutes to about 24 hours.

4. The method of claim 1, wherein said mixture is maintained at a temperature ranging from about room temperature to the boiling point of said solution.

5. The method of claim 1, wherein the slurry contains about 5 weight percent or more of said explosive material and the concentration of the reductant is at least 0.1 molar.

* * * * *